(12) United States Patent
Turner et al.

(10) Patent No.: US 8,248,373 B2
(45) Date of Patent: Aug. 21, 2012

(54) CONTEXTUAL CONTROL OF DYNAMIC INPUT DEVICE

(75) Inventors: Richard Turner, Woodinville, WA (US); Robert D. Young, Kirkland, WA (US); Daniel M. Sangster, Bellevue, WA (US); Scott Robert Honji, Sammamish, WA (US); Eric Fleegal, Bothell, WA (US); Mark Vulfson, Redmond, WA (US); Xianfeng Tian, Sammamish, WA (US); Kevin John Smith, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/818,809

(22) Filed: Jun. 18, 2010

(65) Prior Publication Data

US 2011/0314405 A1    Dec. 22, 2011

(51) Int. Cl.
*G06F 3/02* (2006.01)
*G06F 3/048* (2006.01)
*G09G 5/00* (2006.01)

(52) U.S. Cl. ........ 345/170; 345/168; 345/172; 715/771; 715/773

(58) Field of Classification Search .................. 345/168, 345/170, 172; 715/771, 773
See application file for complete search history.

(56) References Cited

U.S. PATENT DOCUMENTS

| | | | |
|---|---|---|---|
| 5,818,361 A | 10/1998 | Acevedo | |
| 6,401,138 B1 | 6/2002 | Judge et al. | |
| 6,677,933 B1 | 1/2004 | Yogaratnam | |
| 7,069,206 B2 | 6/2006 | Movall et al. | |
| 7,577,915 B2 | 8/2009 | Hunter et al. | |
| 2004/0036632 A1* | 2/2004 | Ford | 341/22 |
| 2006/0152496 A1 | 7/2006 | Knaven | |
| 2008/0168187 A1* | 7/2008 | Ranta et al. | 710/8 |
| 2008/0320410 A1 | 12/2008 | Whytock et al. | |
| 2009/0027346 A1* | 1/2009 | Srivastava et al. | 345/169 |
| 2009/0033522 A1* | 2/2009 | Skillman et al. | 341/23 |
| 2009/0033628 A1* | 2/2009 | Srivastava | 345/169 |

(Continued)

FOREIGN PATENT DOCUMENTS

WO    2007017805 A2    2/2007

OTHER PUBLICATIONS

"Katriend's MSDN Blog", "Silverlight 2: structure of the new .XAP file (Silverlight packaged application)", Mar. 16, 2008 12:17 PM, published on http://blogs.msdn.com/b/katriend/archive/2008/03/16/silverlight-2-structure-of-the-nex-xap-file-silverlight-packaged-application.aspx.*

(Continued)

*Primary Examiner* — William Bashore
*Assistant Examiner* — Grant D Johnson
(74) *Attorney, Agent, or Firm* — Alleman Hall McCoy Russell & Tuttle LLP

(57) ABSTRACT

A computing system includes one or more input-device user-interface runtime applications to dynamically display images on a dynamic input device. The one or more input-device user-interface runtime applications are executed in a currently active desktop. The computing system further includes a dominant application configured to execute in the currently active desktop. The dominant application is configured to specify an input-device user-interface runtime application corresponding to a current context of the dominant application. The specified input-device user-interface runtime application is configured to dynamically display virtual controls on the dynamic input device. The specified input-device user-interface runtime application is also configured to report activation of the virtual controls to the dominant application.

20 Claims, 6 Drawing Sheets

U.S. PATENT DOCUMENTS

| | | | |
|---|---|---|---|
| 2009/0073126 A1* | 3/2009 | Srivastava | 345/168 |
| 2009/0079702 A1 | 3/2009 | Colley | |
| 2009/0174663 A1 | 7/2009 | Rudd | |
| 2009/0198846 A1 | 8/2009 | Bond et al. | |
| 2009/0215512 A1* | 8/2009 | Gannon et al. | 463/16 |
| 2009/0309711 A1* | 12/2009 | Adappa et al. | 340/501 |
| 2009/0319266 A1 | 12/2009 | Brown et al. | |
| 2010/0042682 A1* | 2/2010 | Kaye | 709/203 |
| 2010/0259482 A1* | 10/2010 | Ball | 345/168 |

OTHER PUBLICATIONS

"Silverlight Overview", Retrieved at << http://www.silverlight.net/getstarted/overview.aspx >>, Retrieved Date: Mar. 23, 2010, pp. 3.

"Microsoft Expression Blend 3 Top Features", Retrieved at << http://www.microsoft.com/expression/products/Blend_Overview.aspx >>, Retrieved Date: Mar. 23, 2010, pp. 7.

Neto, João J., "Adaptive Rule-Driven Devices General Formulation and Case Study", Retrieved at << http://citeseerx.ist.psu.edu/viewdoc/download;jsessionid=815E0E7FCE6582F329267EF46CB26A21?doi=10.1.1.85.660&rep=rep1&type=pdf >>, Lecture Notes in Computer Science, vol. 2494, Revised Papers from the 6th International Conference on Implementation and Application of Automata, Jul. 23-25, 2001, pp. 14.

Demeglio, et al., "Accessible Interface Design: Adaptive Multimedia Information System (AMIS)", Retrieved at << http://www.dinf.ne.jp/doc/english/access/amis/amis.html >>, Lecture Notes in Computer Science, vol. 2398, Proceedings of the 8th International Conference on Computers Helping People with Special Needs, Jul. 15-20, 2002, pp. 4.

"Silverlight Enables Great Design", Retrieved at << http://www.microsoft.com/design/article.aspx?type=toolbox&key=silverlight >>, Retrieved Date Mar. 23, 2010, pp. 2.

"Events Overview for Silverlight", Retrieved at << http://msdn.microsoft.com/en-us/library/cc189018(VS.95).aspx >>, Retrieved Date: Mar. 23, 2010, pp. 8.

"Silverlight Overview," Retrieved at <<http://msdn.microsoft.com/en-us/library/bb404700(VS.95).aspx>>, Retrieved date: Jun. 18, 2010, 3 pages.

"MFC ActiveX Controls," Retrieved at <<http://msdn.microsoft.com/en-us/library/k194shk8(VS.80).aspx>>, Retrieved date: Jun. 18, 2010, 3 pages.

"Managed API for Silverlight," Retrieved at <<http://msdn.microsoft.com/en-us/library/cc903953(VS.95).aspx>>, Retrieved date: Jun. 18, 2010, 2 pages.

ISA Korea, International Search Report of PCT/US2011/039321, Feb. 9, 2012, WIPO, 3 pages.

* cited by examiner

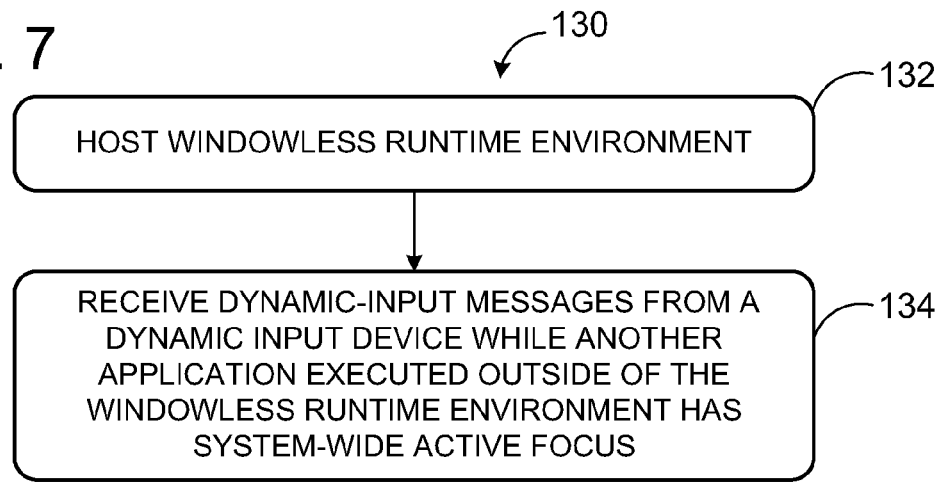
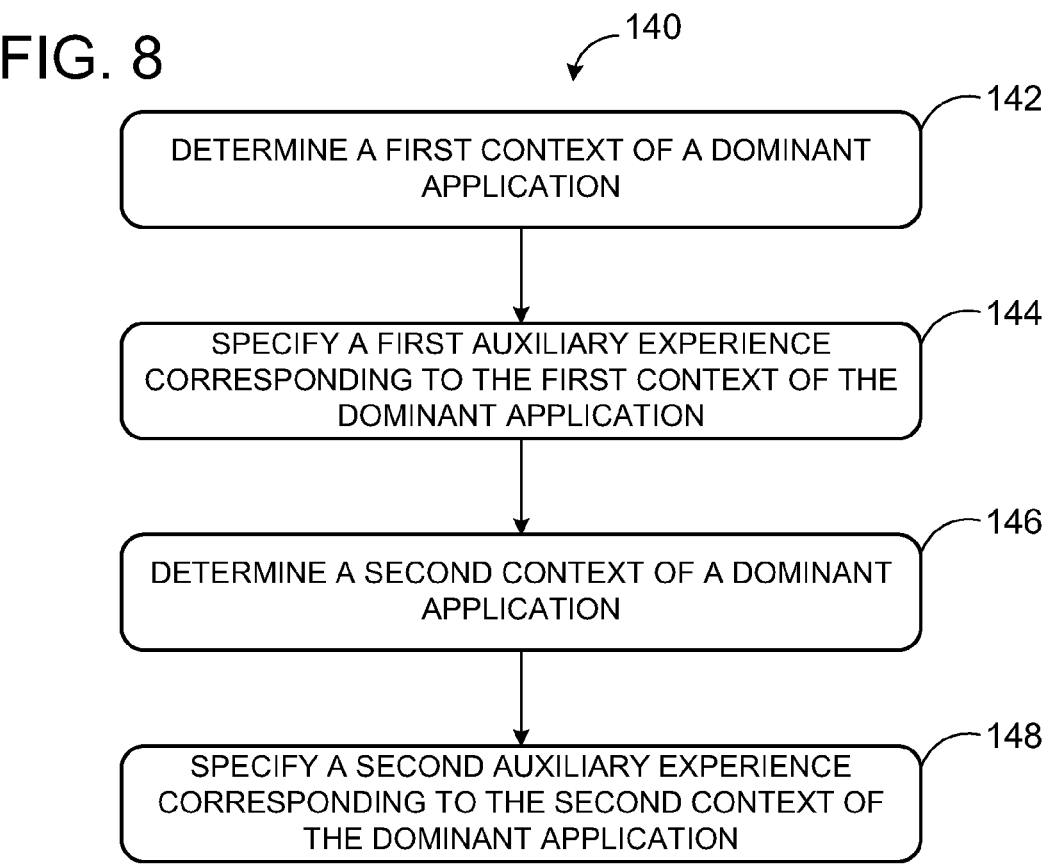

US 8,248,373 B2

CONTEXTUAL CONTROL OF DYNAMIC INPUT DEVICE

BACKGROUND

Many computing systems operate with a single application having system-wide active focus. In such systems, input is automatically routed to the application that currently has system-wide active focus. For example, if a word processing application has system-wide active focus, keyboarding input will automatically be routed to the word processing application, for example to write sentences in a document. The system-wide active focus can be changed from one application to another application, but two different applications will not have system-wide active focus at the same time. For example, system-wide active focus can be changed from the word processing application to a browser application. After such a change, keyboarding input will automatically be routed to the browser application, for example to write a URL in an address bar.

In many systems that enforce system-wide active focus, there is no mechanism for diverting keyboarding input, and other types of input, to an application other than the application with system-wide active focus.

SUMMARY

A computing system in accordance with one aspect of the present disclosure includes one or more input-device user-interface runtime applications to dynamically display images on a dynamic input device. The one or more input-device user-interface runtime applications are executed in a currently active desktop. The computing system further includes a dominant application configured to execute in the currently active desktop. The dominant application is configured to specify an input-device user-interface runtime application corresponding to a current context of the dominant application. The specified input-device user-interface runtime application is configured to dynamically display virtual controls on the dynamic input device. The specified input-device user-interface runtime application is also configured to report activation of the virtual controls to the dominant application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 shows an example method of using a windowless runtime environment to manage input from a dynamic input device.

FIG. 8 shows an example method for a dominant application to implement an auxiliary experience with a dynamic input device.

DETAILED DESCRIPTION

Systems and methods for delivering keyboarding and other types of input to an application other than an application having system-wide active focus are disclosed. As described below, touch input and other types of input from dynamic input devices can be handled by a container module that hosts a windowless runtime environment, within which an auxiliary experience in the form of an input-device user-interface runtime application (UI runtime app) can be hosted. As described in more detail below, dynamic input devices may be configured to display different images at different keys or other input locations. The UI runtime application can control what images are displayed at the different keys or other input locations. When a user pushes a virtual button displayed at an input location, the resulting input message from the virtual button can be routed to the herein disclosed container module for handling apart from the application that currently has system-wide active focus. In some embodiments, input messages resulting from physical key presses may optionally be routed to the herein disclosed container module. In this way, the auxiliary experience, or UI runtime application, can cooperate with a desktop application that has system-wide active focus to provide a user with a rich user experience.

Figure 1:
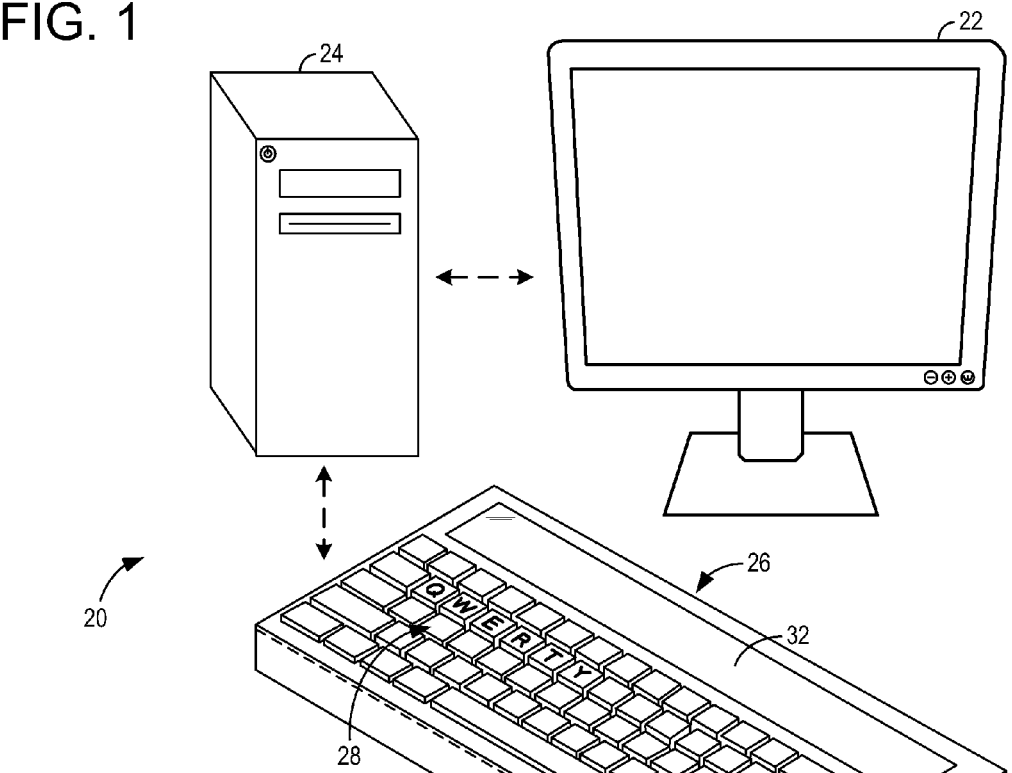
FIG. 1 shows an exemplary computing system including a dynamic input device that provides the ability to display viewable output in connection with the keys of a keyboard assembly.
Figure 2:
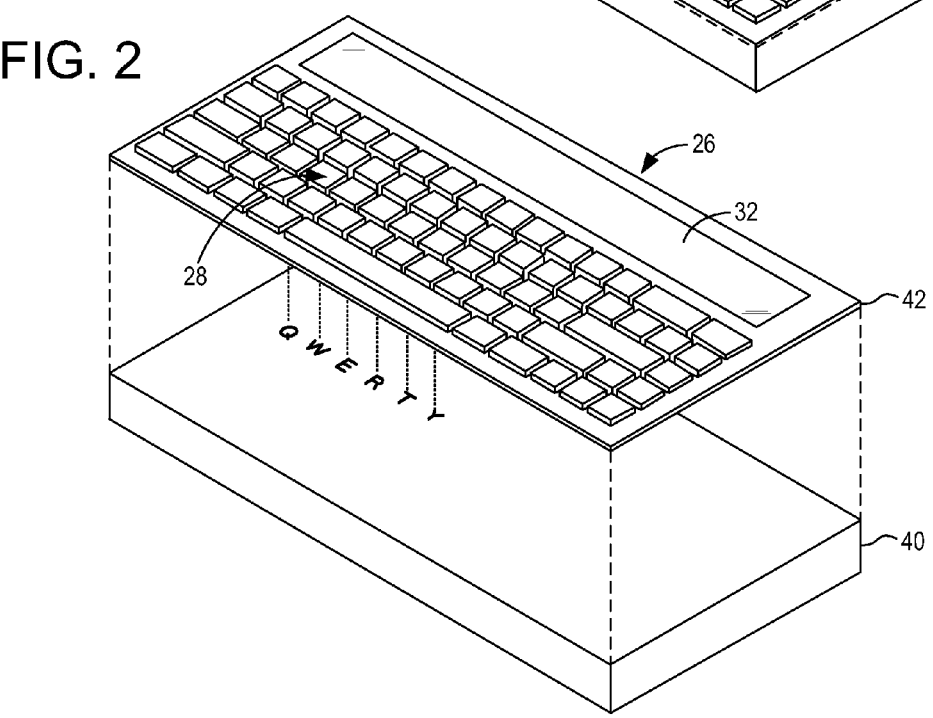
FIG. 2 is an exploded view of the dynamic input device shown in FIG. 1, and shows viewable display output being provided by a display device underlying the keyboard assembly of the dynamic input device.

FIG. 1 shows an exemplary computing system 20 including a display monitor 22, a component enclosure 24 (e.g., containing a processor, hard drive, etc.), and a dynamic input device 26. Dynamic input device 26 may also be referred to as an adaptive input device because the input device is able to dynamically adapt by displaying different images. FIG. 2 provides an additional view of dynamic input device 26 and exemplary components that may be used in its construction. As will be described in various examples, dynamic input device 26 may be implemented to provide displayable output in addition to keyboard-type input functionality. Among other things, the computer peripheral may include keys that facilitate on-key and/or through-key viewing of images. In other embodiments, a dynamic input device may not include keys, but rather one or more display areas capable of recognizing touch activation.

As indicated by the "Q", "W", "E", "R", "T", "Y", etc. on keys 28 (FIGS. 1 and 2), it will often be desirable that dynamic input device 26 be configured to provide conventional alphanumeric input capability. To simplify the illustration, many keys of FIGS. 1 and 2 are shown without indicia, though it will be appreciated that a label or image will often be displayed at each key. Furthermore, in addition to or instead of the "QWERTY" formulation, the keys 28 of the keyboard may be dynamically changed to provide other functions. Keys may be assigned, for example, to provide functionality for various languages and alphabets, and/or to activate other input commands for controlling computing system 20. In some implementations, the key functions may change based on context, for example in response to the changing operational context of a piece of software running on computing system 20. For example, upon pressing of an "ALT" key, the key that otherwise is used to enter the letter "F" might instead result in activation of a "File" menu in a software application. Generally, it should be understood that the keys in the present examples may be selectively depressed to produce any type of input signal for controlling a computer.

Dynamic input device 26 can provide a wide variety of displayable output to enhance and otherwise augment the computing experience. In some examples, the computer peripheral causes a display of viewable output on or near the individual keys 28 to indicate key function. This can be seen in FIGS. 1 and 2, where instead of keys with letters painted or printed onto the keycap surface, a display mechanism (e.g., a liquid crystal display (LCD) device situated under the keys) is used to indicate the "Q", "W", etc. functions of the keys. This dynamic and programmable display capability facilitates potential use of the dynamic input device 26 in a variety of different ways. For example, the English-based keyboard described above could be mapped to provide letters in alphabetical order instead of the conventional "QWERTY" formulation, and the display for each key could then be easily changed to reflect the different key assignments.

The display capability contemplated herein may be used to provide any type of viewable output to the user of computing system 20, and is not limited to alphabets, letters, numbers, symbols, etc. As an alternative to the above examples, images may be displayed in a manner that is not necessarily associated in a spatial sense with an individual key. An image might be presented, for example, in a region of the keyboard that spans multiple keys. The imagery provided need not be associated with the input functionality of the keyboard. Images might be provided, for example, for aesthetic purposes, to personalize the user experience, or to provide other types of output. Indeed, the present disclosure encompasses display output for any purpose. Also, in addition to display provided on or near keys 28, display functionality may be provided in other areas, for example in an area 32 located above keys 28. Still further, area 32 or other portions of dynamic input device 26 may be provided with touch or gesture-based interactivity in addition to the keyboard-type input provided by keys 28. For example, area 32 may be implemented as an interactive touch screen display, via capacitance-based technology, resistive-based technology, or other suitable methods. Further still, in some embodiments, a dynamic computer peripheral may include only touch areas absent of depressible keys.

FIG. 2 shows a nonlimiting example configuration of dynamic input device 26. The provided example is in no way limiting, and it is to be understood that the present disclosure is compatible with any dynamic input device. As shown, dynamic input device 26 may include a display device 40 and a keyboard assembly 42 disposed over and coupled with the display device. Keyboard assembly 42 may be at least partially transparent, to allow a user to view images produced by the display device through the keyboard assembly. In one embodiment, for example, each key 28 has a central transparent portion that allows a user to see the images produced by an LCD panel or other display device situated underneath keyboard assembly 42. In some cases, substantially all of the key will be transparent. In other examples, a periphery portion of the key may be opaque, for example to conceal structures that facilitate upward and downward movement of the keycap. In some embodiments, a keycap may include a lenticular screen or other light diffusing screen onto which images may be rear projected.

A variety of types of display devices may be employed. As indicated briefly above, one type of suitable display device is an LCD device. However, it should be appreciated that the keyboard assembly may be coupled with a variety of other display types, including projection and wedge-projection displays.

As introduced above, input from keyboards and other computer peripherals is typically automatically routed to the application that currently has system-wide active focus. The application that currently has system-wide active focus then directly processes input received this way. In many circumstances, such a framework provides a predictable computing experience to the user. However, in some scenarios, it may be desirable for something other than the application currently having system-wide active focus to process input from keyboards and other computer peripherals. For example, in the context of a dynamic input device, it may be desirable for an auxiliary experience in the form of a UI runtime application to receive input from the dynamic input device and process some or all of such input. Such a paradigm allows the UI runtime application to control the images that are displayed by the dynamic input device. Such a paradigm also allows the UI runtime application to control the ultimate effect of activating keys or other input areas on the dynamic input device.

Centralizing input and output control with the UI runtime application allows desktop applications and other programs to take advantage of the dynamic input device without having to be designed to handle all device input and device display output. In other words, a desktop application written for use with a standard keyboard may be used with a dynamic input device, and an auxiliary experience in the form of a UI runtime application can be used to functionally work between the dynamic input device and the desktop application. The UI runtime application can control what images are displayed by the dynamic input device and how user activation will be interpreted depending on which images are displayed. To allow for this type of control, the UI runtime application is allowed to process at least some input messages instead of the application having system-wide active focus.

To offer such flexibility, the UI runtime application may not be a conventional desktop application that adheres to the conventions of system-wide active focus. As described in more detail below, instead the UI runtime application may operate within a windowless runtime environment as an auxiliary experience to the desktop application.

Figure 3:
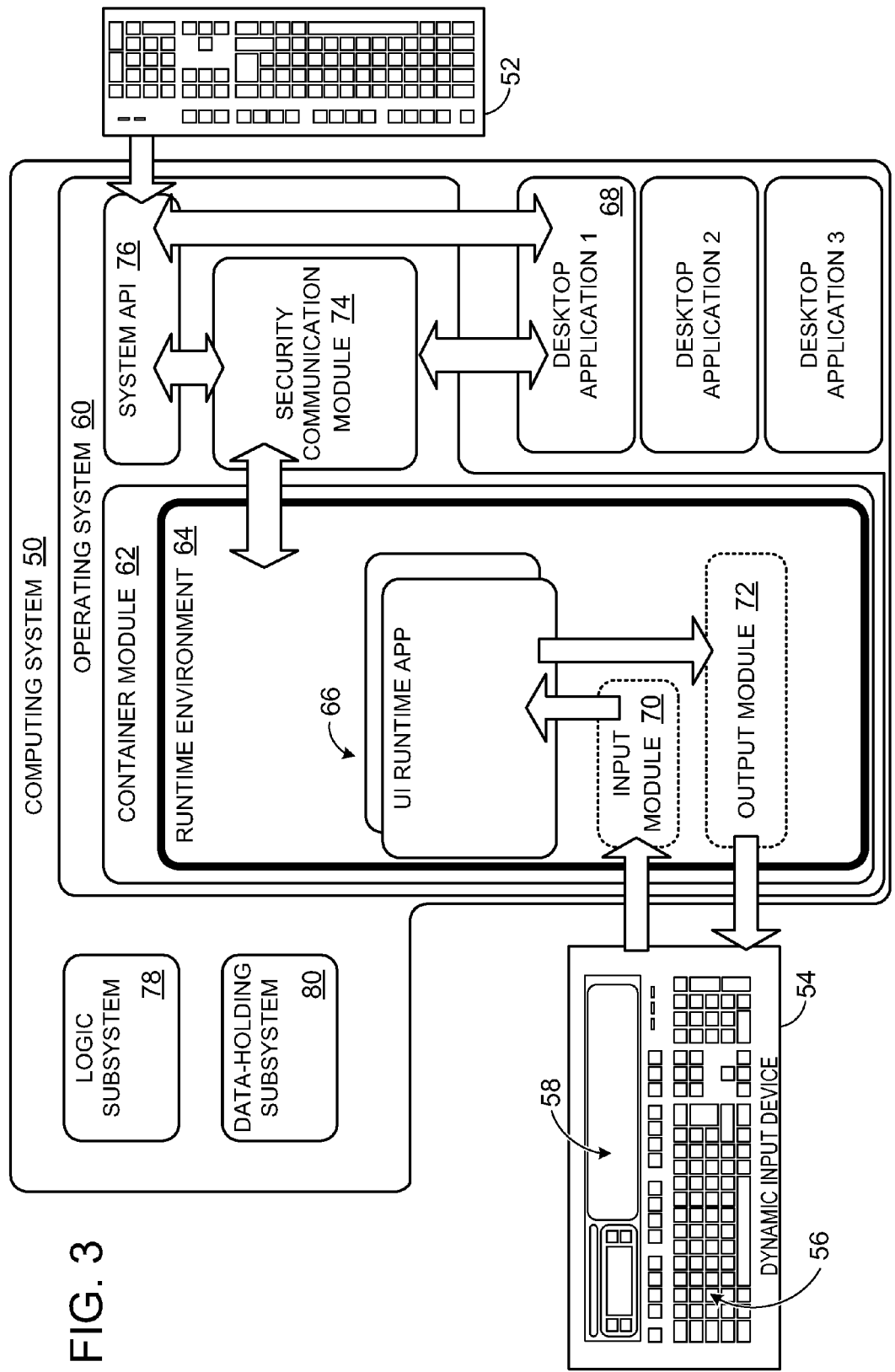
FIG. 3 shows an example computing system in accordance with an embodiment of the present disclosure.

FIG. 3 schematically shows an example embodiment of a computing system 50 that is able to deliver touch input, keyboarding input, and/or other types of input to an application other than an application having system-wide active focus. In particular, FIG. 3 shows a computing system that includes a dynamic input device that delivers input messages to a UI runtime application, as introduced above.

Computing system 50 may optionally include a direct input device 52 in the form of a keyboard. Computing system 50 also includes a dynamic input device 54 in the form of an adaptive keyboard that includes a plurality of keys 56 at which different images can be displayed. Dynamic input device 54 also includes a touch area 58 without keys. The touch area can be used to display one or more virtual buttons or other virtual controls that can be activated by a user. While not shown in this example, a dynamic input device may include a different arrangement or combination of keys and touch areas, and some dynamic input devices may include keys without touch areas or touch areas without keys.

A dynamic input device may be configured to dynamically display a plurality of input images to a user and acknowledge user input directed to any particular one of the plurality of input images. As an example, different input images may be displayed at the plurality of keys 56, and the dynamic input device 54 may output a dynamic-input message that includes an indication of a particular key responsive to user input directed to that particular key. As another example, different input images may be displayed as virtual controls at different locations of the touch area 58, and the dynamic input device 54 may output a dynamic-input message that includes an indication of a particular virtual control responsive to user input directed to that particular virtual control.

Computing system 50 may include an operating system 60 for executing one or more native applications. The operating system 60 may manage and coordinate resource sharing and allocation among executed applications. The operating system 60 may also control at least some I/O functions of the computing system 50. In at least some frameworks, the operating system 60 is configured to allow a single one of the one or more native applications currently being executed to have system-wide active focus. In such frameworks, the operating system 60 directs all direct-input messages from the one or more direct input devices to the native application having system-wide active focus. Nonlimiting examples of operating systems include MICROSOFT® WINDOWS®, APPLE® MAC OS®, and LINUX®.

In some embodiments, the operating system may route keyboard messages (e.g., messages resulting from a keyboard key being pressed) to the application having system-wide active focus. In such cases, operating system hooks may be used to peek at the keyboard messages. These messages may also be sent to a UI runtime application, thus allowing the UI runtime application to respond based on what keyboard messages the UI runtime application observes. On the other hand, touch input messages (e.g., messages resulting from a user touch on a touch area 58) may be routed directly to a runtime environment and converted to messages that the UI runtime application can understand. The touch input messages can be routed to runtime environment without being routed to the application having system-wide active focus.

The dynamic input device may include an interface that does not cause the operating system to enumerate the dynamic input device and treat the dynamic input device as a standard display monitor and/or keyboard. However, in some embodiments, the operating system may enumerate the keys of the dynamic input device as a standard keyboard, but not enumerate the touch area as a standard digitizer in order to avoid touches on the dynamic input device being interpreted as touches on the main display monitor. As described in more detail below, a container module 62, virtual runtime environment 64, and UI runtime application 66 may provide functions that other software can call to receive input (e.g., touch input, key presses, etc.) from the dynamic input device and send image output to the dynamic input device.

Computing system 50 includes a container module 62. The container module may supply an environment in which one or more different controls can run. As a nonlimiting example, container module 62 may be a MICROSOFT® ACTIVEX® container configured to supply an environment in which MICROSOFT® ACTIVEX® controls can run. Container module 62 may manipulate, manage, and provide services to all controls hosted by the container module. For example, container module 62 may supply controls with event handlers. In some embodiments, the container module may be implemented as part of a desktop application.

The container module 62 may be configured to host a control in the form of a runtime environment 64 running in the context of a currently active desktop. While the present disclosure is compatible with any number of different suitable runtime environments, the MICROSOFT® SILVERLIGHT™ runtime environment is provided herein as a nonlimiting example. Using this example, a container module 62 in the form of a MICROSOFT® ACTIVEX® container may host a runtime environment in the form of a MICROSOFT® SILVERLIGHT™ plug-in. However, it is to be understood that other container modules and/or runtime environments may be used without departing from the scope of this disclosure. As a nonlimiting example, the runtime environment may be implemented as an Adobe® Flash® runtime environment.

In some embodiments, runtime environment 64 may be a windowless runtime environment running in the context of a currently active desktop. In other words, the runtime environment 64 may not instantiate a dedicated GUI rendering window, as is done by most native desktop applications and other runtime environments.

In some embodiments, the container module and the windowless runtime environment may utilize the same framework that developers use to develop applications for other purposes. As an example, the windowless runtime environment may be compatible with native browser applications. As such, applications developed for compatibility with the native browser application are compatible with the container module and the windowless runtime environment. In other words, a developer may use the same tools and conventions to develop an application for the windowless runtime environment as the developer would use to develop an application for a native browser application. As such, it is relatively easy to develop for the windowless runtime environment. Using the example from above, any developer that is familiar with developing Microsoft® Silverlight™ applications can develop applications for use with the dynamic input device. As a different example, if the runtime environment is implemented as an Adobe® Flash® runtime environment, any developer that is familiar with developing Adobe®Flash® applications could develop applications for use with the dynamic input device.

Computing system 50 further includes one or more input-device user-interface runtime applications (e.g., UI runtime application 66) executed within the windowless runtime environment. In such a scenario, a different application (e.g., desktop application 68) executed outside of the container module 62 may have system-wide active focus. As such, desktop application 68 will receive conventional input, such as input from direct input device 52 and/or input from those portions of a dynamic input device that are enumerated as standard direct input devices (e.g., the keys of a dynamic keyboard in some embodiments). However, the UI runtime application 66 may be configured to receive dynamic-input messages from the dynamic input device 54. To the point, the UI runtime application receives at least some input from the dynamic input device even though desktop application 68 receives all direct-input messages from the one or more direct input devices.

A desktop application or other dominant application may register and/or specify one or more auxiliary experiences that can control displayable output on the dynamic input device. Such auxiliary experiences may take the form of a UI runtime application running in a windowless runtime environment, for example. As one nonlimiting example, auxiliary experiences may be encapsulated as one or more Microsoft® Silverlight™ XAP files. These auxiliary experiences can be registered via a client application programming interface (API).

One or more experiences can be registered per dominant application, and the dominant application can dynamically specify which of the registered experiences is active based on the current context of the dominant application. Each XAP file or other implementation of an auxiliary experience may be associated with a particular context of the dominant application. In some implementations, such contexts may correspond to different user tasks (e.g., create new email, look up contact, schedule new meeting, review tasks, etc.) that may be carried out via the dominant application. Each context, or task, may be facilitated by dynamically updating the dynamic input device with images, virtual controls, and updated keys that are tailored to assist a user in performing the currently active context or task. The auxiliary experience corresponding to a particular context may be configured to dynamically display a first set of virtual controls on the dynamic input device and report activation of the first set of virtual controls to the dominant application.

The client API can be configured to provide a channel for the dominant applications to send and receive messages to and from the auxiliary experiences. As nonlimiting examples, the application programming interface may include a call for the dominant application to specify an auxiliary experience based on a current context of the dominant application, and a call for the specified auxiliary experience to report activation of virtual controls displayed via the auxiliary experience back to the dominant application.

In some embodiments, the operating system may be configured to route direct input and dynamic input to the application that has system-wide active focus. For example, the operating system may route direct input and dynamic input to a desktop application. In such an embodiment, the desktop application can be configured to determine if a particular input is dynamic or direct. Input that is determined to be dynamic may be routed to UI runtime application 66 for processing. In such embodiments, the desktop application and the UI runtime application may be configured to cooperate and share information via any suitable message passing method (e.g., a message passing API).

In other embodiments, the operating system may be configured to determine if a particular input is dynamic or direct. In such embodiments, the operating system may be configured to route direct input to the application having system-wide active focus while dynamic input is routed to a UI runtime application.

An access control layer (ACL) may use input from injected hooks in the registered applications as well as input from an operating system accessibility system to make decisions about what the final rendered experience is to be on the dynamic input device.

In one implementation, the ACL watches for all focus changes in the operating system so that the ACL is aware of which application has focus. On each focus change, the ACL can remove any auxiliary experiences associated with the application that is losing focus. Next the ACL can look up whether the application gaining focus has any registered auxiliary experiences. If the application gaining focus has registered auxiliary experiences, then the currently "active" auxiliary experience is loaded, initialized, and primed to be rendered. If the application gaining focus does not have registered auxiliary experiences, then the ACL may load, initialize, and prime a default auxiliary experience. Once the correct auxiliary experience has been identified and primed, it is optionally composited with any "default" experiences that are provided by the system (e.g., standard keyboard images displayed on the keyboard keys).

As introduced above, in some embodiments, the rendering system may be a privately hosted MICROSOFT® SILVERLIGHT™ control. However, alternative runtime environments may host the rendering system without departing from the scope of this disclosure. In this example, the active content in the MICROSOFT® SILVERLIGHT™ control can be managed by the ACL and/or supporting control modules. A windowless runtime control, such as MICROSOFT® SILVERLIGHT™, may be used as the only renderer for the dynamic input device. Using the example, the windowless runtime control is a hostable XAML renderer that has an independent focus system. The independent focus system allows the appropriate control feedback to be shown in the auxiliary experiences without affecting the focus state of the operating system.

Mouse messages may be injected into the windowless runtime control based on raw touch data received from the dynamic input device, thus allowing touch input from the dynamic input device to interact with the auxiliary experience directly. A QWERTY manager can be used to give an auxiliary experience notifications about what keys are being pressed on the keyboard. This QWERTY manager, in conjunction with a default QWERTY XAML layout, provides dynamic, appropriate, renderings for each key top on the dynamic input device. This QWERTY manager provides a mechanism of monitoring all keystroke reports independently from the operating system. Additionally, the QWERTY manager is configured to report all key-presses, including key-presses that may not have default support in the runtime environment.

UI runtime application 66 may be configured to output system messages derived from the device messages to the application having system-wide active focus. This may be accomplished via a communication channel between the desktop application and the UI runtime application. The system messages enable the application having system-wide active focus to respond to user input via the dynamic input device. The UI runtime application 66 can send a system message to the application having system-wide active focus that corresponds to the virtual control or key that a user activates, with consideration to the changeable functionality of the virtual control or key, as may be indicated by the image displayed at the virtual control or key. In this way, the dynamic input device 54 may be used to control the application having system-wide active focus. Furthermore, functionality associated with activating any particular key or any particular virtual control can be dynamically changed, and the application having system-wide active focus may receive translated input via the UI runtime application 66 in accordance with the current functionality of that particular key or virtual control.

Using the example provided above, when a MICROSOFT® ACTIVEX® container receives touch input information from the dynamic input device 54, the MICROSOFT® ACTIVEX® container translates this information into MICROSOFT® WINDOWS® mouse message-like information and calls the method for injecting input into the MICROSOFT® SILVERLIGHT™ plug-in, in this case IOleInPlaceObjectWindowless::OnWindowMessage( . . . ).

As discussed above, UI runtime application 66 may be further configured to output display-output messages to the dynamic input device 54. The display-output messages may be used to specify one or more images to be displayed by the dynamic input device. Such images can be used as visual cues that signal to a user the functionality that is dynamically associated with a particular key or virtual control. As described above, the UI runtime application 66 can output a system message corresponding to the image that is displayed at a location (e.g., key or virtual control) to which user input is directed and detected.

Using the example provided above, in processing a mouse message, the MICROSOFT® SILVERLIGHT™ plug-in can change the visual appearance of the dynamic input device. The plug-in may notify the container module 62 of the dirty rect (i.e., collection of changed pixels) via, for example, IOleInPlaceSiteWindowless::InvalidateRect( . . . ).

The container module 62 may use the dirty rect to ask the plug-in to draw the invalid region to a bitmap via IViewObject::Draw( . . . ), for example. The container module 62 may then use the dirty rect and bits from the bitmap to update just the invalid part of the dynamic input device with new image data via appropriate calls.

Runtime environment 64 may optionally include an input module 70 and/or an output module 72. When included, the input module 70 and output module 72 may be used to handle communication between dynamic input device 54 and computing system 50. In some embodiments, a UI runtime application 66, container module 62, and/or operating system 60 may be used to handle communications between dynamic input device 54 and computing system 50. In some embodiments, desktop applications and/or other applications or modules capable of having system-wide active focus may be configured to assist in handling communications between dynamic input device 54 and computing system 50. The APIs introduced herein may be used to facilitate such communication.

Computing system 50 may optionally include a security communication module 74. The security communication module may be used to facilitate secure communication between the UI runtime application 66, runtime environment 64, and/or container module 62 and other aspects of the computing system. As one nonlimiting example, the UI runtime application 66, runtime environment 64, and/or container module 62 may have a signed digital certificate that can be used to verify all messages, so that other aspects of the computing system can verify the certificate to ensure the messages come from a trusted source.

Computing system 50 may also include one or more system APIs 76 that can be used by various system components to access system functionality, including communicating messages. While not shown in FIG. 3, in some embodiments the dynamic input device may utilize the APIs 76.

Turning back to FIG. 3, in some embodiments, computing system 50 includes a logic subsystem 78 and a data-holding subsystem 80. Logic subsystem 78 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 80 may include one or more physical, non-transitory, devices configured to hold data and/or instructions executable by the logic subsystem to implement the herein described methods and processes. As non-limiting examples, the data-holding subsystem 80 may be used to hold the instructions used to execute operating system 60, container module 62, runtime environment 64, UI runtime application 66, and desktop application 68. When such methods and processes are implemented, the state of data-holding subsystem 80 may be transformed (e.g., to hold different data). Data-holding subsystem 80 may include removable media and/or built-in devices. Data-holding subsystem 80 may include optical memory devices, semiconductor memory devices, and/or magnetic memory devices, among others. Data-holding subsystem 80 may include devices with one or more of the following characteristics: volatile, non-volatile, dynamic, static, read/write, read-only, random access, sequential access, location addressable, file addressable, and content addressable. In some embodiments, logic subsystem 78 and data-holding subsystem 80 may be integrated into one or more common devices, such as an application specific integrated circuit or a system on a chip.

The terms "module" and "engine" may be used to describe an aspect of computing system 50 that is implemented to perform one or more particular functions. In some cases, such a module or engine may be instantiated via logic subsystem 78 executing instructions held by data-holding subsystem 80. It is to be understood that different modules and/or engines may be instantiated from the same application, code block, object, routine, and/or function. Likewise, the same module and/or engine may be instantiated by different applications, code blocks, objects, routines, and/or functions in some cases.

Figure 4:
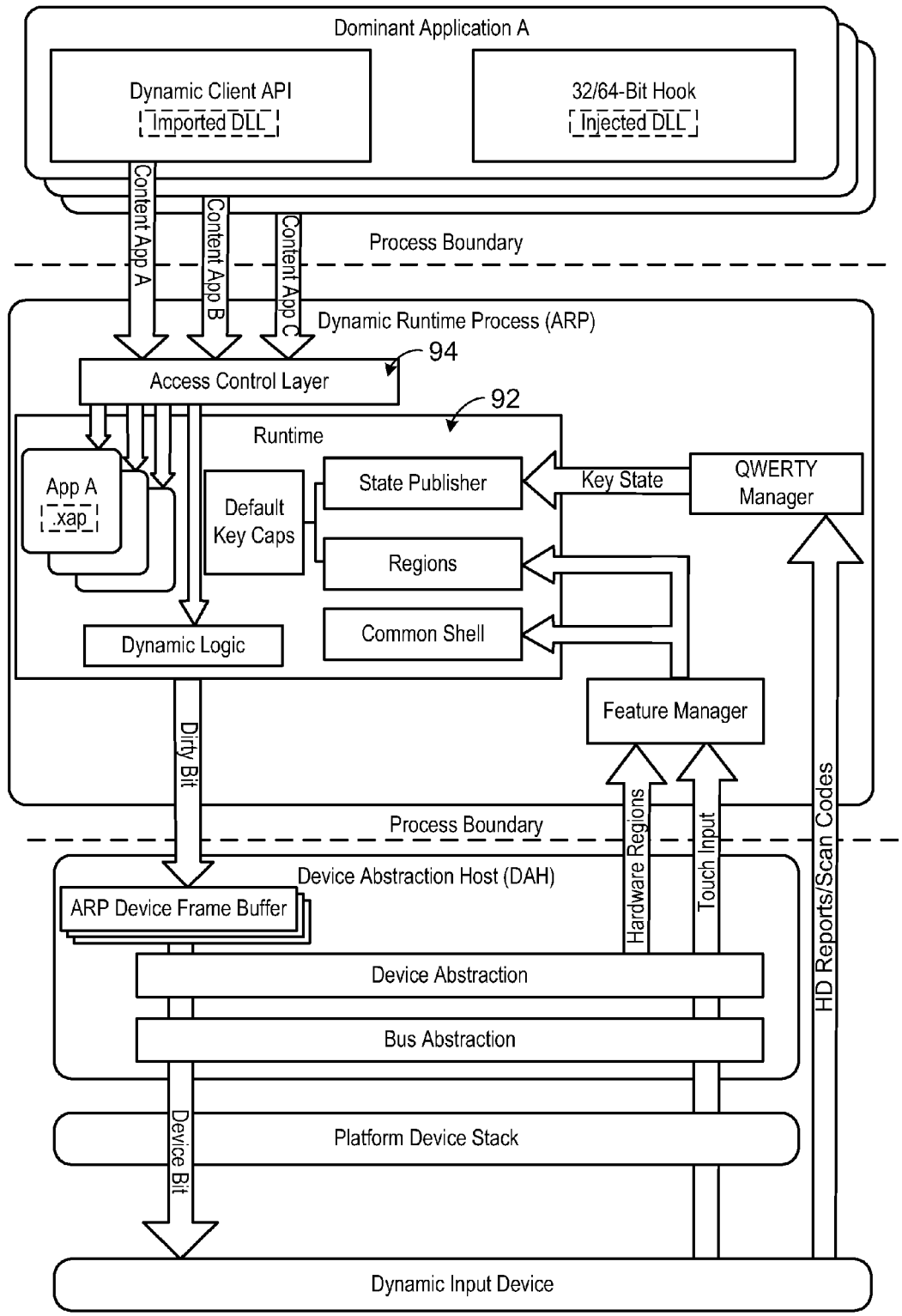
FIG. 4 shows an example architecture for implementing the computing system of FIG. 3.
Figure 5:
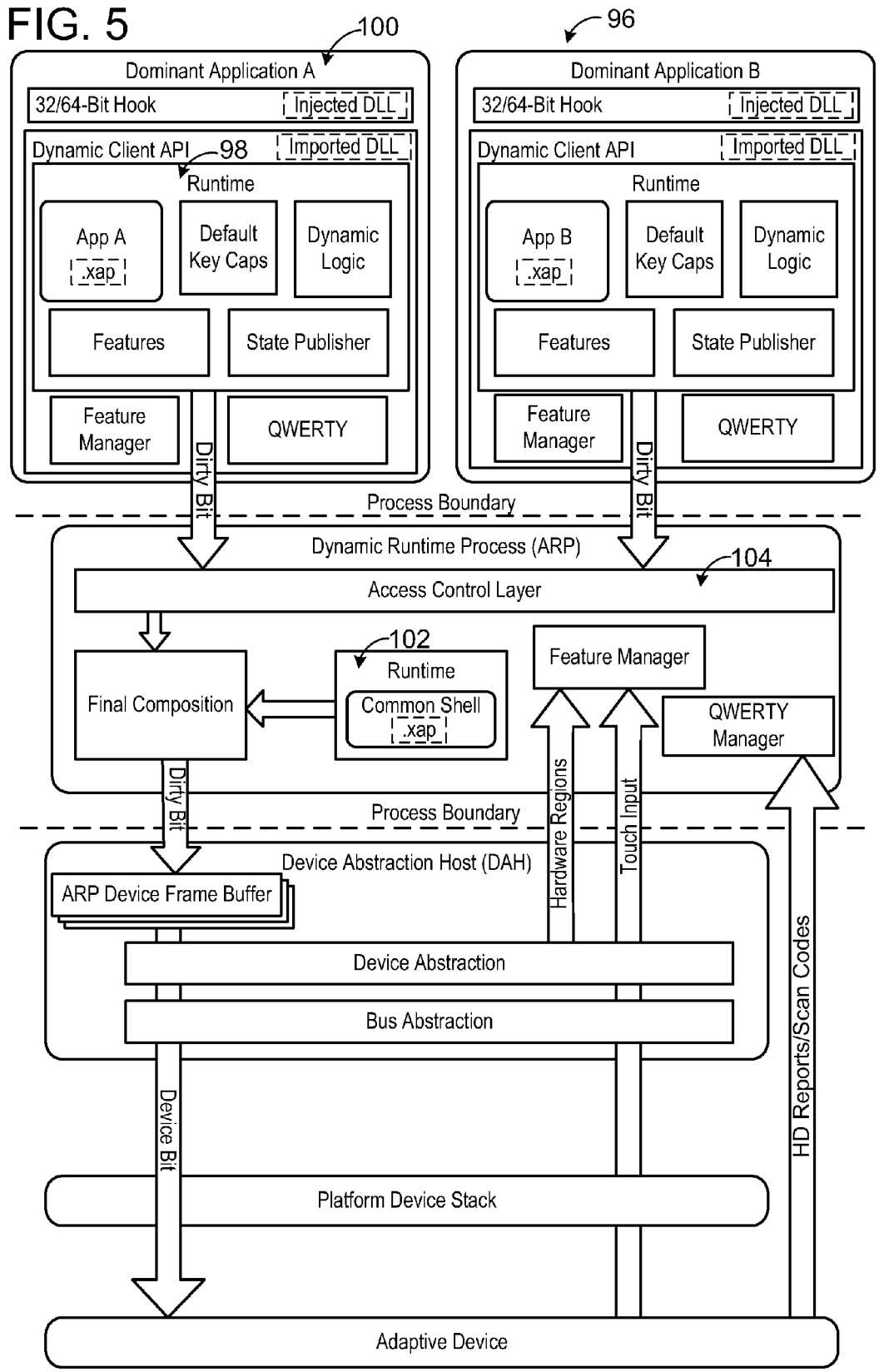
FIG. 5 shows another example architecture for implementing the computing system of FIG. 3.

As discussed above, a desktop application and an auxiliary experience (e.g., a UI runtime application) may cooperate to provide a user with a rich and interactive input experience. Various different architectures and protocols may be used to implement the paradigm described with reference to FIG. 3. FIGS. 4 and 5 show two different example architectures.

In the example architectures of FIGS. 4 and 5, dynamic input devices are handled as rasterizing devices. Therefore, the software stack does not have to support a sophisticated GPU in the dynamic input device, but rather all sophisticated compositing and rendering can be completed on a host computing device. As such, only raster images (bitmaps) are passed to the dynamic input device. In embodiments in which the dynamic input device is not a simple rasterizer, but rather a device with a more powerful CPU and/or GPU, the architecture may be extended such that the runtime environment is hosted on the dynamic input device itself.

A device abstraction can be used to enumerate all adaptive features of a dynamic input device (e.g., does the dynamic input device include a keyboard, does the dynamic input device include a touch sensor, what is the size of the touch sensor, etc.). A device abstraction can also be used to control what is rendered on the dynamic input device. The device abstraction interface can also be used to get fully rendered bitmaps out of a windowless runtime control and rout the fully rendered bitmaps to the dynamic input device for display. The device abstraction interface also provides facilities for dynamic input devices to report touch data as well as any other user interaction with the dynamic input device. This touch data and other information may be routed back for expression in the currently running visual tree in the windowless runtime control. The abstraction is bus (e.g., USB, Ethernet, etc.) agnostic.

FIG. 4 shows an example architecture 90 that uses a shared windowless runtime environment 92 configured to execute input-device user-interface runtime applications specified by two or more different dominant applications. In particular, the example architecture uses a single MICROSOFT® SILVERLIGHT™ control with an access control layer (ACL) 94 configured to manage all registered content from all applications with that single MICROSOFT® SILVERLIGHT™ control. As discussed above, a different runtime environment may be used without departing from the scope of this disclosure. This architecture uses a single control and thus fewer instances of data crossing process boundaries. However, any errant code in any registered auxiliary experience may affect all other experiences.

FIG. 5 shows an example architecture 96 that uses a local windowless runtime 98 environment hosted by a dominant application 100 and configured to execute input-device user-interface runtime applications specified by only that dominant application. In particular, a MICROSOFT® SILVERLIGHT™ control is created inside the process of each dominant application that registers/activates an auxiliary experience. Another MICROSOFT® SILVERLIGHT™ control 102 is created in a separate runtime that is used for a final composition controlled by the rules of the access control layer 104. In addition to tracking focus changes, the ACL is enhanced to track the current bitmap from each associated application/experience. This architecture keeps all application experiences separate, and bad code in a given experience only affects the application that supplies the bad code. Additionally, any security issues are also contained in the application itself. This architecture may also allows for higher fidelity communication channels between the dominant application and associated hosted experience since both the dominant application and the experience are in the same process. This architecture may use a higher bandwidth for cross-processes data sharing.

The example architectures illustrated in FIGS. 4 and 5 and described above are not limiting. Other architectures may be used without departing from the scope of this disclosure.

Figure 6:
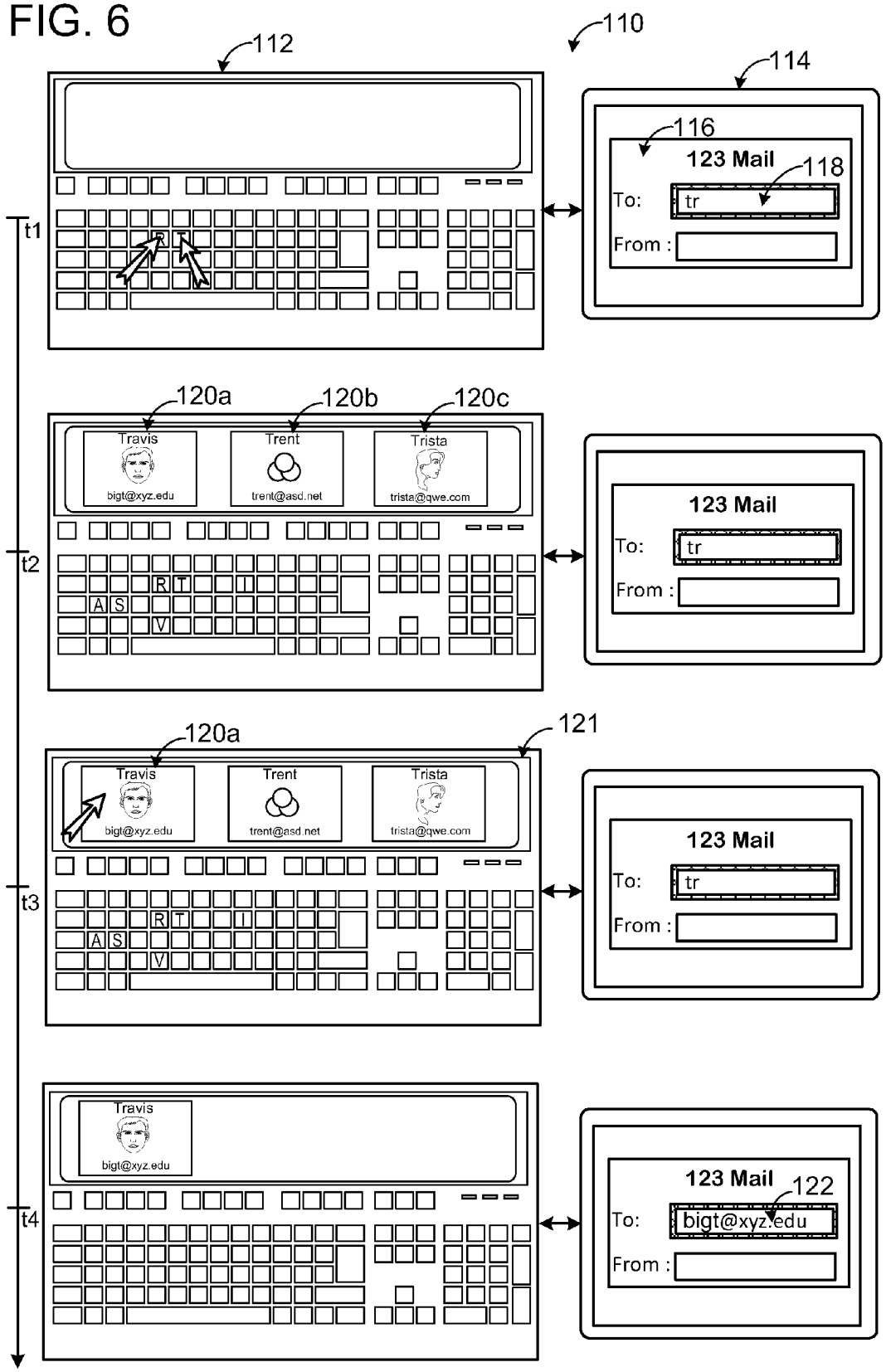
FIG. 6 shows a sequence of user input and dynamic input device output in accordance with an embodiment of the present disclosure.

FIG. 6 somewhat schematically shows a sequence 110 in which user input is performed through a dynamic input device 112, which may serve as a peripheral to a computing device (e.g., computing system 50 of FIG. 3, not shown) using a display 114. In the illustrated example, an email application 116 currently has system-wide active focus of the computing device, and the email application is cooperating with an auxiliary experience in the form of a UI runtime application. Sequence 110 demonstrates an example implementation of the systems and methods described above, which allow a computing device to present graphics on both dynamic input device 112 and display 114. The illustrated sequence 110 is delineated via a timeline that chronologically progresses from time t1 to time t4.

At t1, an input sequence is initiated by a user performing a key input on the dynamic input device 112. In the illustrated example, the key input is a key-down input in which the user depresses the t-key and then depresses the r-key. It is to be noted that dynamic input device 112 may display an image at each key (e.g., an image of a "t" at the t-key and an image of an "r" at the r-key). However, for simplicity of understanding, FIG. 6 only shows key images on those keys that are relevant to this example.

An input sensing subsystem included in the dynamic input device may detect the key inputs and send a key input signal to the computing device, as described above. Any suitable type of message and/or encoding may be used to report the key input. The computing device may process the input signal as described above.

The display may then receive a signal from the computing device and alter the active content presented on the display. In this example, the letters corresponding to the keys are displayed in a text box 118 as the corresponding keys are activated. The email application may also analyze the inputs and predict the content that the user is trying to email.

At t2, the dynamic input device receives a signal from the computing device and presents a plurality of virtual buttons (i.e., contact control button 120a, contact control button 120b, contact control button 120c) on a touch display 121 of the dynamic input device. The virtual buttons correspond to the contacts that the email application has determined are the most likely recipients of the email. It will be appreciated that the virtual buttons may function as controls on a touch screen that a user may touch to activate. The virtual buttons may be supplied to the dynamic input device via the UI runtime application that is providing the auxiliary experience to the email application. As described above, the UI runtime application may be a windowless control.

At t3 the user performs a touch input directed to one of the virtual buttons displayed by the dynamic input device (i.e., contact control button 120a). The sensing subsystem detects the touch input and sends a message to the computing device. As described above, this message can be processed by the UI runtime application, even though the email application has system wide active focus. Upon receiving the message, the UI runtime application can communicate with the email application, indicating that the user has selected the contact corresponding to contact control button 120a.

At t4, in response to the touch input and upon receiving the communication from the UI runtime application, the email application automatically fills in and displays the email address 122 of the contact corresponding to contact control button 120a.

As can be appreciated by the above example, the systems and method described herein allow the dynamic input device to display information to the user in the form of virtual controls and/or dynamic keys that can be activated by the user. Furthermore, the systems and methods described herein allow activation of the virtual controls and, in some embodiments, the dynamic keys to function without the normal restrictions of system-wide active focus.

FIG. 7 shows an example method 130 of using a windowless runtime environment to manage input from a dynamic input device. At 132, method 130 includes hosting one or more runtime environments, including a windowless runtime environment. At 134, method 130 includes receiving dynamic-input messages from a dynamic input device while another application executed outside of the windowless runtime environment has system-wide active focus.

FIG. 8 shows an example method 140 for a dominant application to implement an auxiliary experience with a dynamic input device. At 142, method 140 includes determining a first context of the dominant application. For example, a dominant application may self-determine that the dominant application is in a particular context (e.g., creating a new email, looking up a contact, scheduling a new meeting, reviewing tasks, etc.). An application can have a variety of different contexts, each of which may correspond to a different auxiliary experience.

At 144, method 140 includes specifying a first auxiliary experience. The specified auxiliary experience is separate from the dominant application and corresponds to the first context of the dominant application. As discussed above, the specified auxiliary experience may be configured to dynamically display a first set of virtual controls on the dynamic input device and report activation of the first set of virtual controls to the dominant application.

At 146, method 140 includes determining a second context of the dominant application, different from the first context of the dominant application. For example, the dominant application may self-determine that the dominant application has changed from the first context to the second context (e.g., changed from a create email context to a schedule appointment context). The different contexts may correspond to different auxiliary experiences that are to be displayed via the dynamic input device.

At 148, method 140 includes specifying a second auxiliary experience separate from the dominant application and different from the first auxiliary experience. The second auxiliary experience corresponds to the second context of the dominant application and is configured to dynamically display a second set of virtual controls on the dynamic input device and report activation of the second set of virtual controls to the dominant application.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing system, comprising:
   two or more separate input-device user-interface runtime applications without system-wide active focus to dynamically display images on a dynamic input device, the two or more input-device user-interface runtime applications configured to independently execute within a windowless runtime environment configured to execute in a currently active desktop; and
   a dominant desktop application with system-wide active focus configured to execute outside of the windowless runtime environment in the currently active desktop, the dominant desktop application configured to selectively utilize the two or more separate input-device user-interface runtime applications and to specify from the two or more separate input-device user-interface runtime applications an input-device user-interface runtime application corresponding to a current context of the dominant desktop application, the specified input-device user-interface runtime application configured to dynamically display virtual controls on the dynamic input device and report activation of the virtual controls to the dominant desktop application while the specified input-device user-interface runtime application does not have system-wide active focus.

2. The computing system of claim 1, where the windowless runtime environment is a shared windowless runtime environment configured to execute input-device user-interface runtime applications specified by two or more different dominant desktop applications.

3. The computing system of claim 1, where the windowless runtime environment is a local windowless runtime environment hosted by the dominant desktop application and configured to execute input-device user-interface runtime applications specified by the dominant desktop application.

4. The computing system of claim 1, where the windowless runtime environment is a Microsoft® ActiveX® control.

5. The computing system of claim 4, where the Microsoft® ActiveX® control is a Microsoft® Silverlight™ plug-in.

6. The computing system of claim 4, where the Microsoft® ActiveX® control is an Adobe® Flash® plug-in.

7. The computing system of claim 1, where the two or more input-device user-interface runtime applications are Microsoft® Silverlight™ applications.

8. The computing system of claim 1, where the two or more input-device user-interface runtime applications are encapsulated as two or more Microsoft® Silverlight™ XAP files.

9. The computing system of claim 1, further comprising an application programming interface including a first call for the dominant desktop application to specify the input-device user-interface runtime application, and a second call for the specified input-device user-interface runtime application to report activation of the virtual controls to the dominant desktop application.

10. The computing system of claim 9, where the application programming interface is configured to allow the dominant desktop application to change the two or more input-device user-interface runtime applications executed within the windowless runtime environment as a current context of the dominant desktop application changes so that the virtual controls dynamically displayed on the dynamic input device correspond to the current context of the dominant desktop application.

11. A method for a dominant desktop application with system-wide active focus to implement an input device user interface on a dynamic input device, the method comprising:
   determining a first context of the dominant desktop application;
   specifying a first input device user interface separate from a desktop user interface provided by the dominant desktop application and corresponding to the first context of the dominant desktop application, the first input device user interface configured to dynamically display a first set of virtual controls on the dynamic input device and report activation of the first set of virtual controls to the dominant desktop application via a first input-device user-interface runtime application executing without system-wide active focus within a windowless runtime environment;
   determining a second context of the dominant desktop application, different from the first context of the dominant desktop application; and
   specifying a second input device user interface separate from the desktop user interface provided by the dominant desktop application and different from the first input device user interface, the second input device user interface corresponding to the second context of the dominant desktop application and configured to dynamically display a second set of virtual controls on the dynamic input device and report activation of the second set of virtual controls to the dominant desktop application via a second input-device user-interface runtime application executing without system-wide active focus within a windowless runtime environment.

12. The method of claim 11, where specifying the first input device user interface includes delivering the first input device user interface to a shared windowless runtime environment configured to execute input device user interfaces specified by two or more different dominant desktop applications.

13. The method of claim 11, where specifying the first input device user interface includes delivering the first input device user interface to a local windowless runtime environment hosted by the dominant desktop application and configured to execute input device user interfaces specified by the dominant desktop application.

14. The method of claim 11, where the first input device user interface is delivered to a windowless runtime environment via an application programming interface.

15. The method of claim 14, where the application programming interface provides a communication channel between the dominant desktop application and the first input device user interface when the first input device user interface is executed within the windowless runtime environment.

16. The method of claim 11, where the first input device user interface is a Microsoft® Silverlight™ application.

17. A computing system, comprising:
two or more separate input-device user-interface runtime applications to dynamically display images on a dynamic input device, the two or more input-device user-interface runtime applications configured to independently execute without system-wide active focus in a currently active desktop; and
a dominant desktop application configured to execute with system-wide active focus in the currently active desktop, the dominant desktop application configured to specify an input-device user-interface runtime application corresponding to a current context of the dominant desktop application to selectively execute independently of other of the two or more separate input-device user-interface runtime applications selectively useable by the dominant desktop application, the specified input-device user-interface runtime application configured to dynamically display virtual controls on the dynamic input device and report activation of the virtual controls to the dominant desktop application.

18. The computing system of claim 17, where the two or more input-device user-interface runtime applications are executed within a windowless runtime environment executed in the currently active desktop.

19. The computing system of claim 18, where the windowless runtime environment is a shared windowless runtime environment configured to execute input-device user-interface runtime applications specified by two or more different dominant desktop applications.

20. The computing system of claim 18, where the windowless runtime environment is a local windowless runtime environment hosted by the dominant desktop application and configured to execute input-device user-interface runtime applications specified by the dominant desktop application.

* * * * *